United States Patent Office
3,136,765
Patented June 9, 1964

3,136,765
PROCESSES FOR REACTING DIALKYL AMINES AND HETEROCYCLIC SECONDARY BASES WITH FORMALDEHYDE AND AN ALPHA-HYDROXYACETYLENE
Peter Dimroth, Ludwigshafen (Rhine), Paul Duffner, Ludwigshafen (Rhine)-Gartenstadt, and Rudolf Oster and Heinrich Pasedach, Ludwigshafen (Rhine), Germany, assignors to Badische Anilin- & Soda-Fabrik Aktiengesellschaft, Ludwigshafen (Rhine), Germany
No Drawing. Filed Oct. 14, 1960, Ser. No. 62,539
Claims priority, application Germany Oct. 22, 1959
1 Claim. (Cl. 260—247.7)

This invention relates to a process for producing dialkylamino and N-heterocyclic secondary base derivatives of alpha-hydroxyacetylenes by the reaction of a secondary dialkylamine or N-heterocyclic secondary base with formaldehyde and an alpha-hydroxyacetylene in an aqueous medium in the presence of copper ions.

It is known that α-hydroxyethylacetylenes will not react or will react only unsatisfactorily with formaldehyde and secondary amines (cf. Houben Weyl, Methoden der Organischen Chemie, volume 11/1, p. 772, and German patent specification No. 895,595, Example 7). It is only derivatives of α-hydroxyethylacetylenes, for example, the acetic acid esters or ethers, that can be reacted in a satisfactory manner to form alkylaminohydroxyacetylene derivatives in good yields. These reactions, however, have the disadvantage that the compounds required as initial materials first have to be prepared from the α-hydroxyethylacetylenes. This makes the reactions complicated.

It is an object of the present invention to produce 1-dialkylamino-4-hydroxyacetylenes-(2) and certain 1-(N-heterocyclic)-4-hydroxyacetylenes-(2) without using the said acetic acid esters or ethers.

It is a further object of the invention to produce 1-dialkylamino-4-hydroxyacetylenes-(2) and certain 1-(N-heterocyclic)-4-hydroxyacetylenes-(2) in good yields.

These and other objects of the invention are achieved when, in the production of 1-dialkylamino-4-hydroxyacetylenes-(2) and certain 1-(N-heterocyclic)-4-hydroxyacetylenes-(2) of the general formula:

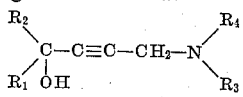

in which $R_1$ represents hydrogen, methyl, ethyl, propyl or phenyl, $R_2$ represents hydrogen, methyl, ethyl or propyl, or $R_1$ and $R_2$ together form part of a cyclohexyl or cyclooctyl radical, i.e., the divalent cyclic radicals $-(CH_2-)_5$ and $-(CH_2-)_7$, $R_3$ represents methyl or ethyl, $R_4$ represents methyl or ethyl, or $R_3$ and $R_4$ together with the nitrogen atom represent a hydrogenated heterocyclic radical containing nitrogen or nitrogen and oxygen, a salt of a secondary amine of the general formula:

in which $R_3$ and $R_4$ have the meanings given above, is reacted in the form of an aqueous solution or suspension with a pH value of between 3 and 6.8 and in the presence of copper ions which formaldehyde and an α-hydroxyacetylene compound of the general formula:

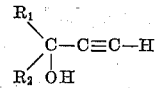

in which $R_1$ and $R_2$ have the meanings given above.

The salts of secondary amines with strong acids, such as hydrochloric acid, sulfuric acid or nitric acid, are used for the reaction. Almost all of these salts are readily soluble in water. The concentration of the salts in the aqueous solution is immaterial as far as the course of the reaction is concerned.

For practical reasons (diminution of volume), concentrated solutions are preferred, but the reaction may also be carried out with dilute solutions. The formaldehyde is used in the form of its aqueous solution which is either added in this form to the mixture of the other reaction components or prepared by introducing gaseous formaldehyde into the aqueous solution or suspension of the other reactants. The concentration of the formaldehyde solution is immaterial as far as the course of the reaction is concerned. For practical reasons (diminution of volume), concentrated solutions are preferred but the reaction may also be carried out with dilute solutions. The copper ions used may be monovalent or divalent. Even very small amounts of copper ions are sufficient for the reaction. For example, the reaction may be carried out in a solution or suspension whose copper ion concentration is 0.001 N. The reaction mixture may, of course, contain considerably more copper ions. The upper limit of the copper ion concentration is determined solely by practical considerations as, after the end product has been separated from the reacted mixture, the copper ions remain in the aqueous solution and can be recovered therefrom only with great difficulty, the α-hydroxyacetylene compounds are reacted in the form of their aqueous solutions or suspensions. In general, the compounds containing a smaller number of carbon atoms are more readily soluble in water than those containing a larger number of carbon atoms. The former are therefore reacted preferably in the form of solutions and the latter preferably in the form of suspensions. The reaction may be carried out with equivalent amounts of the various reactants. For financial reasons, however, the cheap reactant or reactants are usually employed in excess. An excess of 10 to 30% is usual for the purpose. The pH value most favorable for the reaction varies from case to case. It depends, inter alia, on the mineral acid used to set up the pH value, as may be seen from the following table:

Yields of 1-diethylaminopentin-(2)-ol-(4) in percent of the theory obtainable by reacting 1-butin-3-ol with formaldehyde and diethylamine, in dependence on the pH value of the aqueous solution:

| pH value | HCl, percent | H₂SO₄, percent |
|---|---|---|
| 2.7 | 6 | 7 |
| 3.0 | 38 | 40 |
| 4.0 | 46 | 63 |
| 4.5 | 50 | 75 |
| 5.0 | 68 | 68 |
| 5.5 | 74 | 61 |
| 5.6 | 76 | ------ |
| 6.0 | 54 | 52 |
| 6.8 | 42 | 38 |
| 7.2 | 12 | 10 |

A pH value of between 4.1 and 5.5 is preferred.

The amine required for the reaction may be used in the form of its salt with a mineral acid and the pH value of the aqueous solution modified, or the amine as such is suspended or dissolved in water and the pH value of the mixture adjusted to the desired value by adding a mineral acid. The aqueous solutions or suspensions thus obtained are then heated for some time at 40° to 100° C. with equivalent amounts of formaldehyde, or advantageously with an excess of 10 to 30% thereof, and the α-hydroxyacetylene compound in the presence of copper ions, for example from a copper salt (as a rule, copper sulfate is used). By adding an alkali compound, for example sodium hydroxide, potassium hydroxide, sodium carbonate, potassium carbonate or ammonia, the end product may be separated from the solutions formed in the reaction and may then be isolated in pure form in the usual manner, for example by extraction with solvents and distillation or crystallization. The use of ammonia has the additional advantage that the copper is not precipitated in the alkaline solution because soluble copper-ammonia complexes form. The yield of 1-dialkylamino-4-hydroxyacetylenes-(2) is 75% to 95% of the theory. The 1-dialkylamino-4-hydroxyacetylenes-(2) obtainable according to the invention are suitable for use as additives to galvanic baths. They improve the quality of metallic coatings electro-deposited from such baths.

The following examples will further illustrate this invention, but the invention is not restricted to these examples. The parts are by weight.

*Example 1*

A mixture of 90 parts of diethylamine and 90 parts of water is neutralized with sulfuric acid. Then 120 parts of a 40% aqueous formaldehyde solution, 70 parts of 1-butin-3-ol and a solution of 5 parts of copper sulfate in 100 parts of water are added. A pH value of 4.5 is set up in the mixture by adding sulfuric acid, and the mixture is then heated for 4 hours at 80°. After cooling, 300 parts of concentrated aqueous ammonia solution and 150 parts of benzene are added to the solution. The whole is shaken out, the benzene solution is separated, and the aqueous layer is stirred out with 100 parts of benzene. The aqueous layer is discarded and the combined benzene solutions are dried with potassium carbonate and distilled. 117 parts of pure 1-diethylamino-pentin-(2)-ol-(4) (boiling point 96° C. at 1 mm. Hg. refractive index n 25/D 1.4679) are obtained. The yield is 75% of the theory.

*Example 2*

By following the procedure described in Example 1, but using hydrochloric acid instead of sulfuric acid and working at a pH value of 5.6, 119 parts of 1-diethyl-aminopentin-(2)-ol-(4) are obtained. The yield is 76% of the theory.

*Example 3*

A mixture of 90 parts of diethylamine and 90 parts of water is neutralized with sulfuric acid. Then 120 parts of a 40% aqueous formaldehyde solution and a solution of 56 parts of propargyl alcohol in 48 parts of water are added, and the pH value of the mixture is adjusted to 5.0. The mixture is then heated for 5 hours at 80° C., cooled, 400 parts of concentrated aqueous ammonia solution are added, and the aqueous layer is separated by stirring twice, each time with 100 parts of benzene. The combined benzene solutions are dried with potassium carbonate, concentrated by evaporation to a considerable extent, and the residue is distilled in vacuo. 115 parts of 1-diethylaminobutin-(2)-ol-(4) (boiling point 105° C. at 2 mm. Hg; refractive index n 25/D 1.4774) are obtained. The yield is 82% of the theory.

*Example 4*

A mixture of 90 parts of pyrrolidine and 90 parts of water is neutralized by adding concentrated sulfuric acid. Then 120 parts of a 40% aqueous formaldehyde solution, 124 parts of 1-ethinyl-cyclohexanol-(1) and a solution of 5 parts of copper sulfate in 100 parts of water are added. A pH value of 5.3 is set up in the mixture by adding acid. The suspension is then heated for 3 hours at 90° C. and a clear solution is formed. After cooling, 400 parts of concentrated aqueous ammonia solution are added to the mixture, and the separated organic layer is taken up in benzene. The benzene solution is dried with potassium carbonate, the reaction product is precipitated by adding petroleum ether to the solution and filtered off. 152 parts of 1-pyrrolidino-4-pentamethylenebutin-(2)-ol-(4) (melting point 53° C.) are obtained. After evaporation and digestion of the residue with petroleum ether, the mother liquors yield another 35 parts of this compound so that a total of 187 parts is obtained. The yield is 87% of the theory.

*Example 5*

By following the procedure described in Example 4, but using 110 parts of morpholine instead of pyrrolidine, 211 parts of 1-morpholine-4-pentamethylenebutin-(2)-ol-(4) (melting point 63° C.) are obtained. The yield is 95% of the theory.

*Example 6*

By following the procedure described in Example 1, but using 98 parts of hexin-(1)-ol-(3) instead of 1-butin-3-ol, 146 parts of 1-diethylamino-4-propylbutin-(2)-ol-(4) (boiling point 102° C. at 0.001 mm. Hg) are obtained. The yield is 79% of the theory.

*Example 7*

By following the procedure described in Example 4, but using 132 parts of 1-phenyl-propin-(2)-ol-(1) instead of 1-ethinyl-cyclohexanol-(1), 184 parts of 1-pyrrolidino-4-phenylbutin-(2)-ol-(4) (melting point 110° C.) are obtained. The yield is 85% of the theory. The reaction product has the following constitutional formula:

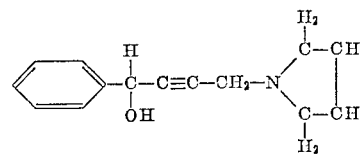

*Example 8*

By following the procedure described in Example 4, but using 60 parts of dimethylamine instead of pyrrolidine and 152 parts of 1-ethinyl-cyclooctanol-(1) instead of 1-ethinyl-cyclohexanol-(1), 196 parts of 1-dimethylamino-4-heptamethylenebutin-(2)-ol-(4) (melting point 60° to 61° C.) are obtained. The yield is 93% of the theory.

*Example 9*

By following the procedure described in Example 1, but using 127 parts of diethylamine hydrochloride instead of diethylamine, 120 parts of 1-diethylaminopentin-(2)-ol-(4) are obtained. The yield is 76% of the theory.

*Example 10*

By following the procedure described in Example 1, but using 5 parts of copper acetate instead of copper sulfate, 115 parts of 1-diethylaminopentin-(2)-ol-(4) are obtained. The yield is 75% of the theory. Similar yields are obtained by using copper nitrate or copper chloride.

*Example 11*

By following the procedure described in Example 1, but using 100 parts of piperidine instead of diethylamine, 132 parts of 1-piperidino-pentin-(2)-ol-(4) (boiling point 99° C. at 0.8 mm. Hg; refractive index n 25/D 1.4703) are obtained. The yield is 77% of the theory.

*Example 12*

By following the procedure described in Example 1, but using 84 parts of 3-methyl-1-butin-3-ol instead of 1-butin-3-ol, 142 parts of 1-diethylamino-4-methyl-2-pentin-4-ol (boiling point 74° C. at 0.2 mm. Hg; refractive index n 25/D 1.4600) are obtained. The yield is 84% of the theory.

What we claim is:

A process for the production of hydroxyacetylenes of the formula:

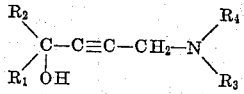

in which $R_1$ represents a member selected from the group consisting of hydrogen, methyl, ethyl, propyl and phenyl, $R_2$ represents a member selected from the group consisting of hydrogen, methyl, ethyl and propyl, and also, together with $R_1$, the divalent radicals $-(CH_2-)_5$ and $-(CH_2-)_7$, $R_3$ represents a member selected from the group consisting of methyl and ethyl, $R_4$ represents a member selected from the group consisting of methyl and ethyl, and together with $R_3$ and the nitrogen to which $R_3$ and $R_4$ are attached a member selected from the group consisting of pyrrolidino, piperidino, and morpholino, wherein a strong mineral acid salt of a secondary amine of the general formula:

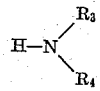

in which $R_3$ and $R_4$ have the meanings given above in an aqueous medium with a pH value between 3 and 6.8 is reacted with formaldehhyde and an α-hydroxyacetylene compound of the formula:

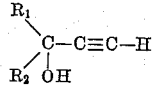

in which $R_1$ and $R_2$ have the meanings given above, in the presence of copper ions of a copper salt catalyst ionized in said aqueous medium in an amount sufficient to provide a copper ion concentration in said aqueous medium of at least 0.001 N.

References Cited in the file of this patent

UNITED STATES PATENTS

| | | |
|---|---|---|
| 2,268,129 | Reppe et al. | Dec. 30, 1941 |
| 2,273,141 | Reppe et al. | Feb. 17, 1942 |

FOREIGN PATENTS

| | | |
|---|---|---|
| 879,990 | Germany | June 18, 1953 |
| 1,024,773 | Germany | Feb. 20, 1958 |

OTHER REFERENCES

Zhurnal Obschei Khimii, volume 27, page 1520 (1957).